Jan. 22, 1924.

G. A. SCHULTE

CASTER

Filed Aug. 18, 1922

1,481,748

Inventor.

George A. Schulte,
By Frederick V. Winters,
Attorney.

Patented Jan. 22, 1924.

1,481,743

UNITED STATES PATENT OFFICE.

GEORGE A. SCHULTE, OF NEWARK, NEW JERSEY.

CASTER.

Application filed August 18, 1922. Serial No. 582,786.

*To all whom it may concern:*

Be it known that I, GEORGE A. SCHULTE, a citizen of the United States, residing at Newark, in the county of Essex and State of New Jersey, have invented certain new and useful Improvements in Casters, of which the following is a full, clear, and exact specification.

This invention relates to casters of the sliding or dome type, and has for its object to provide a caster of this kind which is simple in construction, inexpensive to manufacture and easy to attach to a furniture leg.

A special object is to provide a simple and durable form of sliding or dome caster having means for attaching it to a socketed furniture leg in such a manner that said caster will not be easily displaceable or apt to be dislodged when the furniture is moved. Other objects will appear as the description proceeds.

The invention will be first hereinafter described in connection with the accompanying drawings, which constitute part of this specification, and then more specifically defined in the claims at the end of the description.

In the accompanying drawings, wherein similar reference characters are used to designate corresponding parts throughout the several views:—

Figure 1:
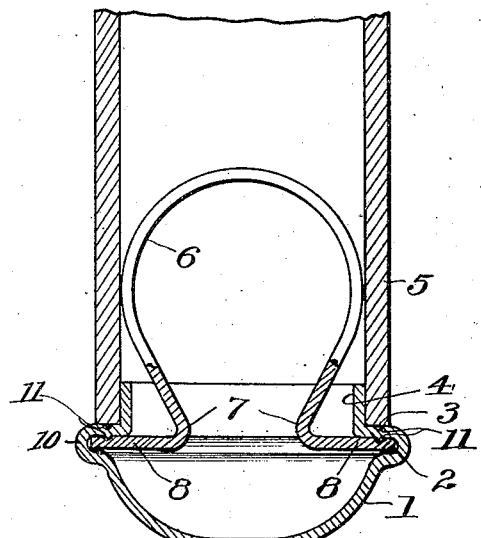
Figure 1 is a section of a socket furniture leg and a caster constructed substantially in accordance with this invention applied thereto.
Figure 2:
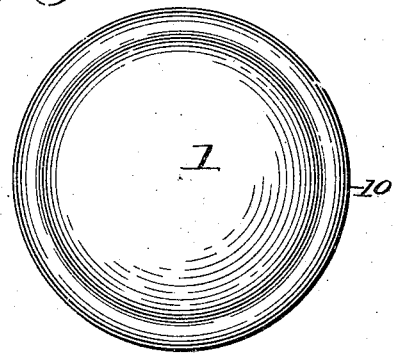
Figure 2 is a bottom plan view of the caster.
Figure 5:
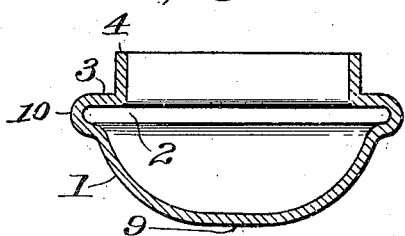
Figure 5 is a section of the caster proper with the spring retaining member removed.
Figure 3:
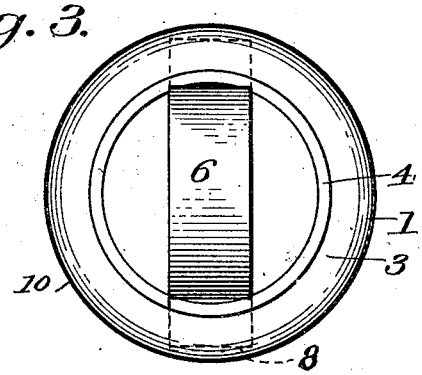
Figure 3 is a top plan view of the same.
Figure 4:
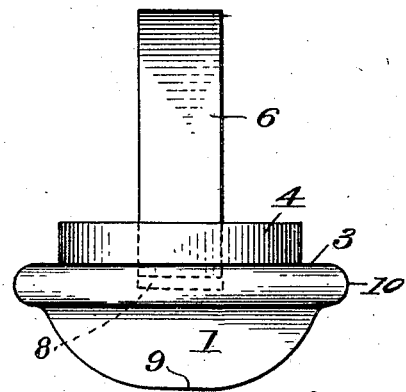
Figure 4 is a side elevation of caster.
Figure 6:
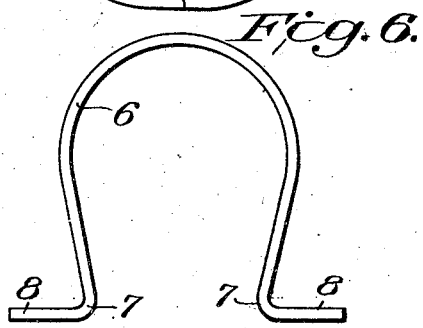
Figure 6 is a detailed view of said spring retaining member.

The caster proper 1 is formed in any suitable manner from a single piece of suitable material and is bowl-shaped, its base portion conforming generally to the usual shape of a sliding or dome caster. The upper portion of said caster is formed with a horizontally projecting annular bead 10 having an internal groove 2 opening on the interior of the hollow caster body. Above said bead the material of the caster extends inward forming an annular horizontal ledge 3 from the inner edge of which said material extends vertically upward forming an annular flange 4.

It will be understood that caster 1 may be made in various dimensions or stock sizes to fit different sizes of socketed furniture legs. In each instance, the flange 4 is designed to fit snugly within the lower end of the socket of the furniture leg 5, see Figure 1, the lower end of said leg resting upon the ledge 3 of the caster. It will be noted that under the weight of the furniture any tendency to crush or flatten out the caster body will cause the flange 4 to more firmly engage the inner walls of the socket in the leg, so that there is no danger of said caster being displaced when in use.

To prevent the caster from slipping out of the socket in the leg when the latter is raised, especially when the caster is first applied, a spring retaining member 6 is provided, the same comprising a looped strip of resilient material conforming generally to an inverted U and having its extremities bent outwardly in opposite directions at 7 to form laterally extending lugs 8. In assembling the spring retaining member 6 with the caster body, the looped portion of said member is compressed sufficiently to insert the ends of the lugs 8 into the groove 2 of said caster body, after which the expansion of said loop will cause said lugs to engage in said groove where they are rigidly fastened or fixed in any suitable manner, as by punching or upsetting portions of the material at 11, Figure 1. The looped portion of the retaining member is compressed to some extent when inserted into the socket of the furniture leg so that said resilient looped portion will frictionally engage the inner walls of said socket. The base of the caster body 1 is preferably flattened slightly, as at 9, so that it will not make dents in the floor under heavy furniture.

I claim:—

1. A dome caster having an annular flange to extend into and engage the inner walls of the socket in the furniture leg, there being an external ledge on said caster at the base of said flange on which the base of said leg may rest.

2. A dome caster having an annular flange to extend into and engage the inner walls of the socket of a furniture leg, said caster also having an external ledge at the base of said flange on which the base of said leg may rest, and a bead on the caster at the outer edge of said ledge.

3. A dome caster having an annular flange to extend into and engage the inner walls of the socket of a furniture leg, said caster also having an external ledge at the base of said flange on which the leg may rest, and a bead on the caster arranged at the outer edge and below said ledge.

4. A dome caster having an annular flange to extend into and engage the inner walls of the socket of a furniture leg, said caster also having a bead below said flange with a groove opening on the inside of the caster, and a spring retaining member having fixed engagement with said groove for the purpose specified.

5. A dome caster having an annular flange to extend into and engage the inner walls of the socket in a furniture leg, said caster also having a bead below said flange on which the base of the furniture leg may rest, there being a groove at the inner face of said bead, and a looped spring retaining member having outwardly extending ends having fixed engagement with said grooves for the purpose specified.

6. A dome caster having an annular flange to extend into and engage the inner walls of the socket of a furniture leg, said caster also having an external ledge at the base of said flange on which the leg may rest, a bead below said flange with a groove opening on the inside of the caster, and a spring retaining member having its ends fixedly engaged in said groove.

In testimony whereof I have signed my name to this specification.

GEORGE A. SCHULTE.